United States Patent [19]
Fujimoto et al.

[11] Patent Number: 5,197,067
[45] Date of Patent: Mar. 23, 1993

[54] PACKET COMMUNICATION SYSTEM USING A TELEPHONE SWITCHING NETWORK AND A DATA FLOW CONTROL METHOD

[75] Inventors: Akio Fujimoto, Yokohama; Nobuo Shirai, Hino, both of Japan

[73] Assignee: Fujitsu Limited, Kawasaki, Japan

[21] Appl. No.: 879,457

[22] Filed: May 4, 1992

Related U.S. Application Data

[63] Continuation of Ser. No. 584,147, Sep. 18, 1990, abandoned.

[30] Foreign Application Priority Data

Sep. 18, 1989 [JP]  Japan .................................. 1-241439

[51] Int. Cl.$^5$ .................................................. H04L 12/56
[52] U.S. Cl. .................................................... 370/94.1
[58] Field of Search ........................ 370/94.1, 60, 58.1

[56] References Cited

U.S. PATENT DOCUMENTS

| | | | |
|---|---|---|---|
| 4,443,875 | 4/1984 | Blausten | 370/60 |
| 4,649,533 | 3/1987 | Chorley et al. | 370/58.3 |
| 4,876,681 | 10/1989 | Hagiwara et al. | 370/94.1 |
| 4,888,767 | 12/1989 | Furuya et al. | 370/60 |
| 4,951,278 | 8/1990 | Biber et al. | 370/94.1 |
| 4,975,910 | 12/1990 | Onder | 370/60 |

Primary Examiner—Douglas W. Olms
Assistant Examiner—T. Samuel
Attorney, Agent, or Firm—Staas & Halsey

[57] ABSTRACT

Data flow control applied to a packet communication system including data terminal equipment (DTE), a first MODEM connected to one of the DTEs, a telephone switching nework (TSN) connected to the first MODEM, a packet switching network (PSN) having an assembly and disassembly equipment (PAD) and a second MODEM connected to PAD and provided between PAD and TSN and carried out by using MODEM control signals, logic signal "1" and "0", and control characters, DC1 and DC3, is performed: discriminating a designated response signal, /REL in CONNECT $\alpha\beta\gamma\delta$/REL. from a header of data transferred through the first and second MODEMs each having a buffer memory used for error correction of the data. In addition the MODEM control signals are made effective and the control characters are made ineffective and are controlled when the designated response signal is detected. The MODEM control signals are made ineffective and the control characters are made effective when no designated response signal is detected at PAD.

13 Claims, 11 Drawing Sheets

PACKET COMMUNICATION SYSTEM USING A TELEPHONE SWITCHING NETWORK AND A DATA FLOW CONTROL METHOD

This application is a continuation of application Ser. No. 07/584,147, filed Sep. 18, 1990, now abandoned.

BACKGROUND OF THE INVENTION

1. Field of the Invention

The present invention relates to a packet communication system for performing packet data communication through the system including a packet switching network and a telephone switching network, and a data flow control method applied to the system.

2. Description of the Related Art

Packet communication system are widely used in data communications because data transmitting lines having high utility factors are used in the packet communication system.

A typical packet communication system is schematically illustrated in FIG. 1, instancing a case where data are switched and transferred between a data terminal equipment 1 or 11 such as a personal computer and a host computer 8 in the packet communication system. FIG. 1 shows two cases of packet communication systems. One is a packet communication system 100 depicted by a one-dot dashed line enclosure and the other is a packet communication system 200 depicted by a two-dot dashed line enclosure.

The packet communication systems 100 and 200 include a packet switching network (PSN) 7 and a plurality of host computers (HC) 8 connected to PSN 7, respectively. The packet communication system 100 further includes an ordinary telephone switching network (TSN) 4 connected to PSN 7 and a plurality of data terminal equipments (DTE) 1 connected to TSN 4. However, the packet communication system 200 further includes a plurality of DTE 11 connected to PSN 7. DTE 11 is a packet mode DTE having an exclusive packet transmit-receive function, while DTE 1 is a non-packet mode DTE having no packet transmit-receive function. Since the packet communication system 100 includes TSN 4, a modulator and demodulator (MODEM) is necessary to be placed between DTE 1 and TSN 4 and between TSN 4 and PSN 7 respectively. A box having reference numeral 2 or 3 represents the former and a box having reference numeral 5 represents the latter. The packet communication system 200 may be an ideal system for packet communication. However, because of the development of data communication, TSN 4 and the usual non-packet mode DTEs 1 connected to TSN 4 must be allowed to be used in the packet communication system.

In the packet communication system 100, since DTE 1 has no packet transmit-receive function, a packet assembly and disassembly equipment (PAD) 6 is necessary to be provided in the packet communication system 100. In FIG. 1, PAD 6 is included in PSN 7. The PAD 6 is for packing data sent from a plurality of DTEs 1 into a packet by using a buffer memory provided in PAD 6 and for controlling the flow of data stored or to be stored in the buffer memory. This control is called a data flow control.

Generally, a telephone switching network generates an error during switching which must be corrected. Error correction is performed at MODEMs placed across the telephone switching network. In FIG. 1, MODEMs 2 and 5 placed across TSN 4 have an error correction function respectively. However, there is a case that the MODEM arranged between DTE and TSN has no error correction function. MODEM 3 in FIG. 1 is the MODEM having no error correction function.

Thus, the packet communication system 100 includes not only the ordinary TSN 4 but also many types of ordinary and new equipment connected to TSN 4, such as ordinary non-packet mode DTEs 1, new type MODEMs 2 and 5 having the error correction function and ordinary MODEM 3 having no error correction function. Therefore, for maintaining the packet communication system 100, many kinds of data flow control must be performed under various conditions for the equipment. Accordingly, many problems regarding the data flow control occur in the packet communication system 100.

FIG. 2 shows a block diagram of the packet communication system 100 of the related art. In FIG. 2, the same reference numerals as in FIG. 1 designate the same network or equipment as in FIG. 1. Actually, a plurality of DTEs 1 are connected to TSN 4 and a plurality of HCs 8 are connected to PSN 7, however, two DTEs 1 and one HC 8 are representatively depicted in FIG. 2. Therefore, the data flow control for data transmitted between one of the DTEs 1 and HC 8 through TSN 4 and PSN 7 will be discussed with reference to FIG. 1. Since DTEs 1 are non-packet mode DTEs, it is required to provide a MODEM between respective DTE 1 and TSN 4. The MODEM is separated into two kinds in accordance with whether the MODEM has an error correcting function or not. Formerly the error correcting function has not been provided in the MODEM. However, recently a MODEM having the error correcting function has been produced as an article of commerce. For instance, a MODEM called "MNP", which is an abbreviation of Microcom Network Protocol, is a typical MODEM having the error correcting function. The MODEM called MNP is produced by MICRO-COM Inc. in U.S.A. and MNP may be a registered tradename of MICROCOM Inc. MNP is intended to be a standard MODEM recommended by the Consultative Committee of International Telegraph and Telephone (CCITT), having the error correction function. When data are sent to the MNP, the MNP checks the data and corrects the error if there is an error in the data, producing a corrected data. Then, modulation is performed in the MNP by using the corrected data and a modulated data is output from the MNP. However, at the same time, the corrected data is stored in a buffer memory provided in the MNP. The stored corrected data is resent from the MNP when the MNP is required to resend the corrected data.

In FIG. 1 or 2, the MNP is applied to MODEMs 2 and 5 respectively. Therefore, MODEM 2 or 5 will be called MMD (MNP Modulator Demodulator) 2 or 5 hereinafter. MMDs 2 and 5 have a buffer memory (BM) 21 and BM 51 respectively for storing the corrected data. On the other hand, MODEM 3 has no error correcting function, so that MODEM 3 has no buffer memory and will be called NMD (Not-MNP Modulator Demodulator) 3 hereinafter.

As shown in FIGS. 1 and 2, PSN 7 includes PAD 6 for performing the data flow control. As shown in FIG. 2, PAD 6 includes a buffer memory (BM) 63 for storing data to perform packet switching, and is connected to MMD 5.

In FIG. 2, although the functions of the two DTEs 1 are the same, the DTE 1 connected to MMD 2 will be called DTE 1-1 and the DTE 1 connected to NMD 3 will be called DTE 1-2 hereinafter for the sake of the explanation of the packet communication system 100. In FIG. 2, when a data is sent from DTE 1-1 to PAD 6 or vice versa, error correction is performed by MMDs 2 and 5 in cooperation. For instance, when a data is sent from DTE 1-1 to PAD 6 through MMD 2, TSN 4 and MMD 5, MMDs 2 and 5 check and correct errors as follows. MMD 2 checks whether there is an error in the data sent from DTE 1-1. If there is an error in the data, MMD 2 corrects the error, producing a corrected data. Then MMD 2 outputs the corrected data and at the same time stores the corrected data in BM 21. When MMD 5 receives the data from MMD 2, MMD 5 checks whether there is another error in the data sent from MMD 2. If there is another error in the data sent from MMD 2 through TSN 4, MMD 5 asks MMD 2 to resend the correct data. Then, MMD 2 resends the correct data. The above steps are repeated until the correct data is received at MMD 5. When the correct data is received at MMD 5 from MMD 2, MMD 5 sends the correct data to BM 63 in PAD 6 and at the same time stores the correct data into BM 51. In the above, the steps of data correction are only described and the modulation and demodulation of data performed at MMDs 2 and 5 are omitted from being described. When data is sent from PAD 6 to DTE 1-1, the error correction is performed at MMDs 2 and 5 the same as above mentioned, using BMs 21 and 51 respectively.

In the error correction operation described above, when BM 63 in PAD 6 is in a state (which will be called a "not-full state" hereinafter) having room for storing data, the corrected data can be transferred to BM 63 from MMD 5 as mentioned above. However, when BM 63 is in a state (which will be called a "full state" hereinafter) of having no room for storing data, MMD 5 is stopped from transferring the corrected data to BM 63 until BM 63 becomes the not-full state. Also as above-mentioned, when BM 51 in MMD 5 becomes the full state, MMD 2 is stopped from transferring the corrected data to MMD 5 until BM 51 becomes the not-full state. Further, when BM 21 in MMD 2 becomes the full state, DTE 1-1 is stopped from transferring data to MMD 2 until BM 21 becomes the not-full state. In contrast to the above, when BM 51 is in the not-full state, a data stored in BM 63 is transferred to MMD 5. However, when BM 51 is in the full state, PAD 6 is stopped from transferring the data to MMD 5 until BM 51 becomes the not-full state. Also as above-mentioned, when BM 21 is in the full state, MMD 5 is stopped from transferring the data to MMD 2 until BM 21 becomes the not-full state.

In a case where data is transferred from DTE 1-2 to BM 63 through NMD 3, TSN 4 and MMD 5, the data is directly transferred to BM 63. This stops MMD 5 from performing error correction by using BM 51 because NMD 3 has no error correcting function and no buffer memory. In this case, when BM 63 is in the full state, DTE 1-2 is stopped from sending data to BM 63.

The data transfer performed between DTE 1-1 and BM 63 or between DTE 1-2 and BM 63 as mentioned above is carried out by data flow control. The data flow control is performed in accordance with various control procedures. For instance, the data flow control carried out between MMD 2 and MMD 5 is performed by a control procedure predetermined so as to be matched with the MODEM MNP, the data flow control carried out between MMD 5 and PAD 6 is performed by control signals, and the data flow control carried out between DTE 1-1 and MMD 2 is performed by control characters such as DC1 and DC3 of X.3 recommended the CCITT.

In FIG. 2, symbols RTS and CTS are signal lines for transferring the control signals and symbols TXD and RXD are data lines on which the control characters are transferred with payload data. The data flow control performed by such control signals and characters will be detailed below with reference to FIG. 2.

As shown in FIG. 2, signal lines RTS (Request To Send) and CTS (Clear To Send) are provided between MMD 5 and PAD 6 and between MMD 2 and DTE 1-1. These signal lines are used for transferring control signals. For instance, when BM 63 in PAD 6 becomes the full state because of data sent from MMD 5 through a data line RXD (Received Data), PAD 6 sends a control signal of logic "0" to MMD 5 through RTS so as to stop MMD 5 from sending data to BM 63, and when BM 63 becomes the not-full state, PAD 6 sends a control signal of logic "1" to MMD 5 through RTS so as to make MMD 5 start to send data to BM 63 through RXD. As above-mentioned, when BM 51 in MMD 5 becomes the full state because of data sent from PAD 6 through a data line TXD (transmitted Data), MMD 5 sends a control signal "0" to PAD 6 through CTS so as to stop PAD 6 from sending the data to MMD 5. When BM 51 becomes the not-full state, MMD 5 sends a control signal "1" to PAD 6 through CTS so as to make PAD 6 start to send the data to MMD 5 through TXD.

The data flow control performed between DTE 1-1 and MMD 2 is carried out by either the control characters such as DC1 and DC3 or the same control signals as those used in the data flow control between MMD 5 and PAD 6.

In case of transferring data from DTE 1-2 to PAD 6 through NMD 3, TSN 4 and MMD 5, it is not necessary to carry out data flow control between DTE 1-2 and NMD 3, NMD 3 and MMD 5, and MMD 5 and PAD 6 individually. The data flow control between DTE 1-2 and PAD 6 is carried out only by the control characters DC1 and DC3, which is predesignated by either DTE 1-2 or HC 8. For instance, when BM 63 becomes the full state because of data transferred from DTE 1-2, PAD 6 sends DC3 to DTE 1-2 through TXD connecting PAD 6 with MMD 5, MMD 5, TSN 4, NMD 3 and TXD connecting NMD 3 with DTE 1-2, for stopping DTE 1-2 from sending data to PAD 6. When BM 63 becomes the not-full state, PAD 6 sends DC1 to DTE 1-2 through the same path as the above for making DTE 1-2 start to send data to PAD 6.

As shown in FIG. 2, PAD 6 includes of: a control signal transmit-receive controller (SGC) 61 for controlling a transmit-receive function of control signals transferred between PAD 6 and MMD 5 through CTS and RTS respectively; a data transmit-receive unit (TRU) 62 for sending and receiving the payload data with control characters between PAD 6 and MMD 5 through TXD and RXD respectively; a buffer memory (BM) 63 for storing data so as to form a packet; a data flow controller (DFC) 64 operating with control characters, for counting a quantity of storing data into BM 63 and making TRU 62 send the control character such as DC1 or DC3 to MMD 5 through TXD, together with the payload data sent from TRU 62; and a data flow controller (SFC) 65 operating with control signals, for counting a quantity of storing data into BM 63 and making SGC 61 send the control signal "0" or "1" to MMD 5 through RTS and for discriminating the control signal "0" or "1" received from MMD 5 through CTS and SGC 61 and making TRU 62 control the transmission of data to be sent to MMD 5 through TXD.

However, when PAD 6 is used in the packet communication system 100 shown in FIG. 2, there have been problems about the data flow control stated above.

In FIG. 2, when PAD 6 is connected with DTE 1-1 through MMD 5, TSN 4 and MMD 2, problems occur as will be explained below in reference to FIGS. 3(a), 3(b) and 3(c). In FIGS. 3(a), 3(b) and 3(c), the same reference numerals used in FIG. 2 designate the same equipment or network as in FIG. 2, and reference symbols "f" and "n" represent the full state and the not-full state of the buffer memory respectively.

When, as shown in FIG. 3(a), data flow control is performed respectively between DTE 1-1 and MMD 2 by the control characters DC1 and DC3, between MMD 2 and MMD 5 by the predetermined procedure matched to the MNP MODEM as described before and between MMD 5 and PAD 6 by the control signals "1" and "0", and furthermore when data flow control is performed between DTE 1-1 and PAD 6 by the control characters DC1 and DC3 and DTE 1-1 is preset so as to be controlled only by the control characters DC1 and DC3, the following problem (first problem) occurs.

First problem: When BM 63 is in the full state, BM 51 and BM 21 become the full state successively, and DTE 1-1 is controlled so as not to send data to MMD 2 by the control character DC3 sent from MMD 2. After that, when BM 63 becomes the not-full state, SFC 65 in PAD 6 detects the not-full state of BM 63 and makes SGC 61 in PAD 6 send a control signal "1" to MMD 5 through RTS and at the same time DFC 64 in PAD 6 detects the not-full state of BM 63 and makes TRU 62 in PAD 6 send a control character DC1 to DTE 1-1 through TXD, MMD 5, TSN 4, and MMD 2, as shown in FIG. 3(b). However, since DC1 is received by DTE 1-1 earlier than BM 21 in MMD 2 becomes the not-full state because of the control signal "1" applied to MMD 5 from PAD 6, data are sent from DTE 1-1 to MMD 2 though BM 21 in the full state. This produces a problem (first problem) that the data sent from DTE 1-1 to MMD 2 are annulled.

When, as shown in FIG. 3(c), PAD 6 is connected to DTE 1-1 through MMD 5, TSN 4 and MMD 2, and when data flow control is performed between DTE 1-1 and MMD 2 by the control signals "1" and "0", between MMD 2 and MMD 5 by the predetermined procedure matched to MNP MODEM as described before and between MMD 5 and PAD 6 by the control signals "1" and "0", and furthermore when data flow control is performed between DTE 1-1 and PAD 6 by DC1 and DC3 and DTE 1-1 is preset so as to be controlled only by the control signals "1" and "0", the following problem (second problem) occurs:

Second problem: When BM 51 and therefore BMs 51 and 21 are in the not-full state, MMD 2 sends the control signal "1" to DTE 1-1 and DTE 1-1 sends data to MMD 2. Then, when BM 63 becomes the full state, SGC 61 sends the control signal "0" to MMD 5 and TRU 62 sends the control character DC3 to DTE 1-1. However, DTE 1-1 continues to send data to MMD 2 even though PAD 6 sends DC3 to DTE 1-1 because DTE 1-1 has been preset so as to be controlled only by the control signals "1" and "0". This results in a problem (second problem) that DC3 is nulled, so that DTE 1-1 performs an invalid operation.

As seen from the above, PAD 6 has two functions one of which is for producing the control signals "1" and "0" and the other of which is for producing the control characters DC1 and DC3. As a result, the data flow control based on the control signals "1" and "0" and that based on the control characters DC1 and DC3 are affected by each other in the packet communication system 100, producing the problems that the data flow control cannot be performed normally and correctly.

SUMMARY OF THE INVENTION

Therefore, an object of the present invention is to stop the occurrence of infection happening due to an interaction between the control signal and the control character during the data flow control performed by using the signal and character in the packet communication system including TSN.

Another object of the present invention is to increase reliability of performing the data flow control in the packet communication system.

The above objects are achieved by providing means called a classified link discriminator (CLD) to PAD in PSN. When MODEMs provided between DTE and TSN and between TSN and PAD are both MNP MODEMs (MMDs), the data flow control required between both MMDs is performed in accordance with the designated procedure matching the error correction. When such data flow control is performed between MMDs, a signal CONNECTION $\alpha\beta\gamma\delta$/REL, e.g. CONNECTION 2400/REL, is added to a header and sent to PAD with the data (payload data). Wherein, CONNECT $\alpha\beta\gamma\delta$/REL is a kind of AT command used in the MODEM, developed by a USA company and now becomes the standard in the art, and $\alpha\beta\gamma\delta$ indicates the communication speed (2400 indicates the communication speed of 2400 bps). When PAD receives the data, a part of the data is sent to CLD where the data is checked whether the signal CONNECT 2400/REL has a particular signal REL is included in the data. When REL is discriminated from the data at CLD, CLD determines that the link for carrying out the error correction and the data flow control under the MNP procedure has been established between MMDs. Then, CLD controls DFC and SFC in PAD so that DFC is ineffective and SFC is effective. As a result, only the control signals such as "1" and "0" are used for the data flow control in the packet communication system. Consequently, the problems of the data flow control due to the interaction between the control signal and the control character can be avoided. Incidentally, when the MODEM provided between DTE and TSN is not MMD, in other words, the MODEM is an ordinary MODEM having no error correction, the signal REL cannot be discriminated from the data at CLD. As a result, CLD controls DFC and SFC so that PAD controls the data flow in the packet communication system only by the control character such as CD1 and CD3. Consequently, the data flow control can be performed normally in the system when the MODEM provided between DTE and TSN has no error correction function.

DESCRIPTION OF THE PREFERRED EMBODIMENTS

Figure 2:
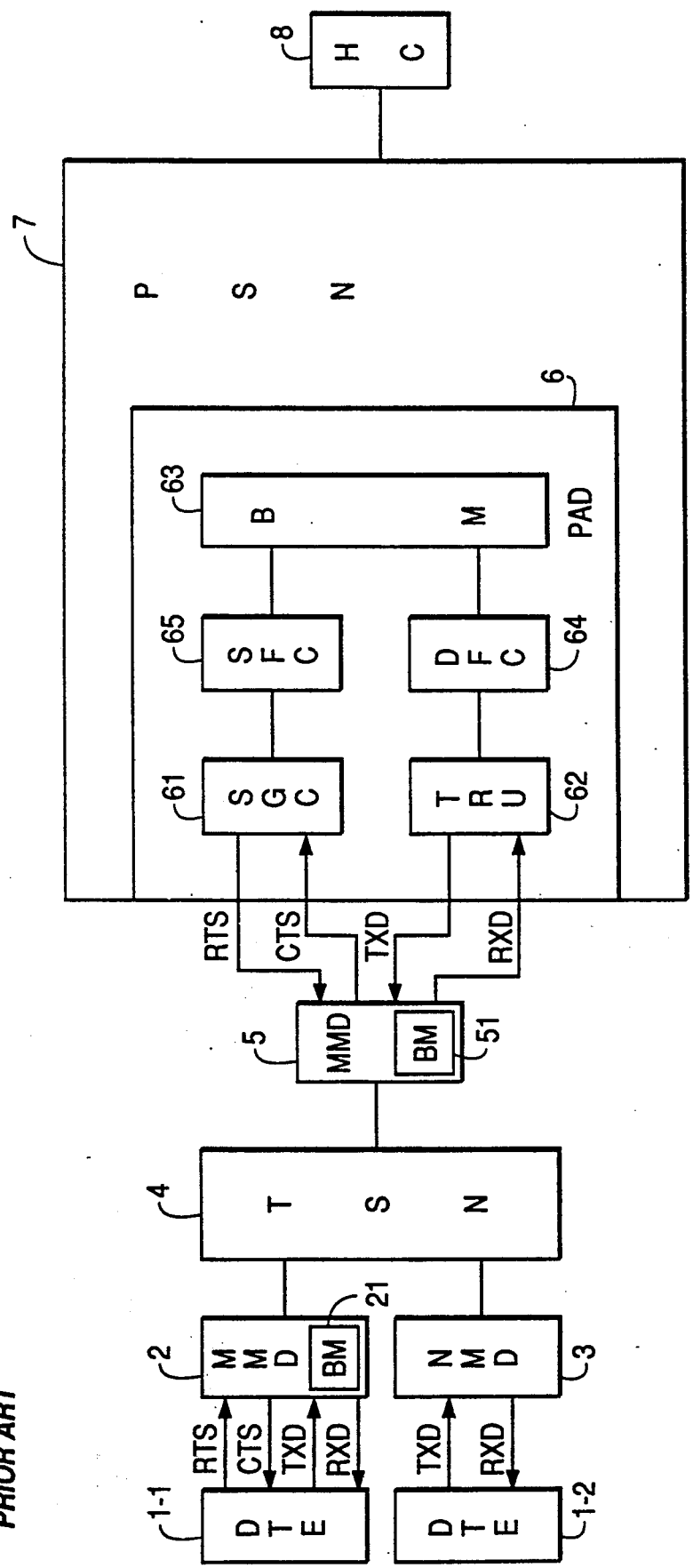
FIG. 2 is a block diagram of a prior art packet communication system.
Figure 4:
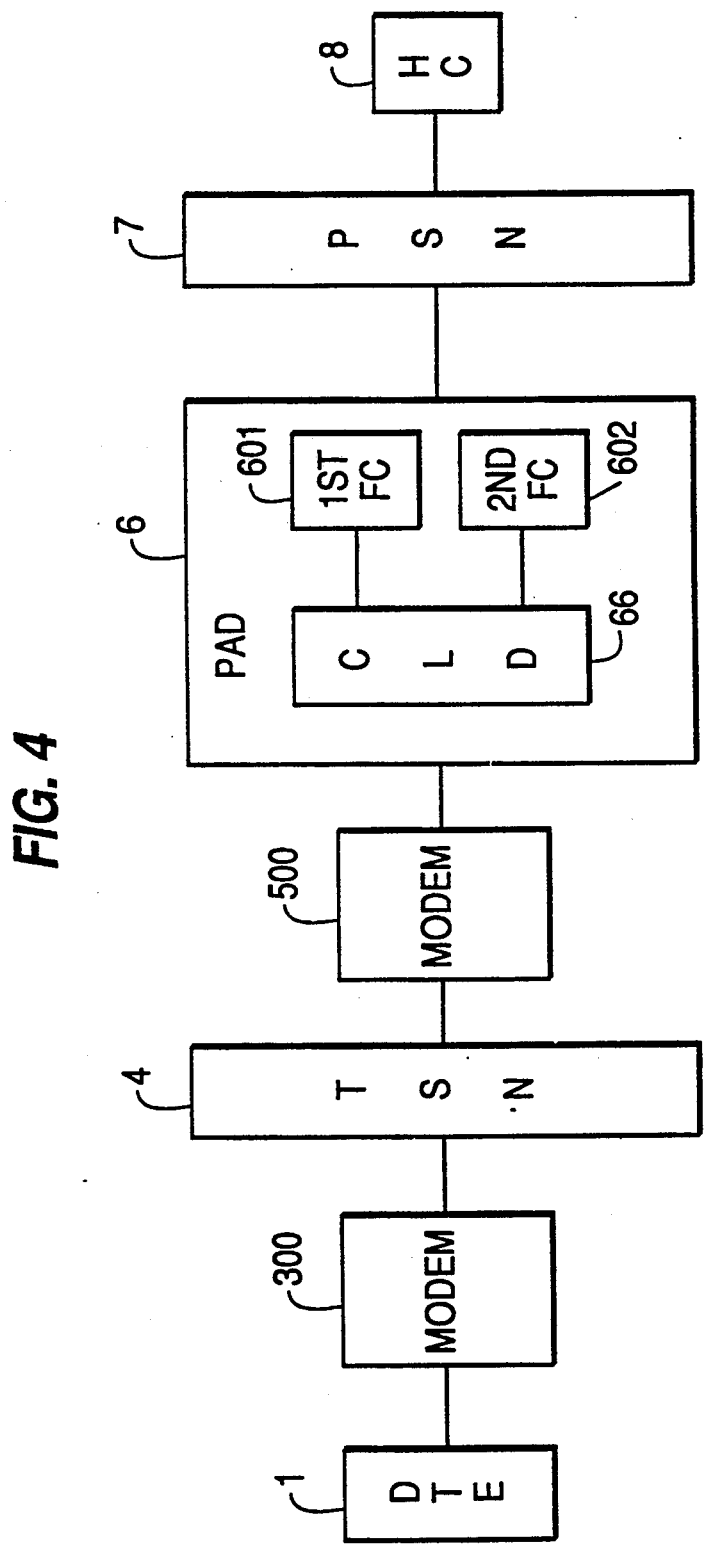
FIG. 4 is a block diagram of a packet communication system according to of the present invention.

FIG. 4 is a schematic block diagram of a packet communication system for explaining a principle of the present invention. In FIG. 4, the same reference numerals as used in FIG. 2 designate the same equipment or network as in FIG. 2. Box 1 is a DTE which represents DTEs 1-1 and 1-2 in FIG. 2, box 300 is a MODEM which represents MMD 2 and NMD 3 in FIG. 2 and a box 500 is a MODEM provided between DTE and TSN equal to MMD 5 in FIG. 2. Therefore, the same packet communication system 100 as in FIG. 2 is shown in FIG. 4. However, in accordance with the present invention, a method for performing the data flow control is improved in the packet communication system in FIG. 4. Means 66 called (a classified link discriminator (CLD)) is newly provided in PAD 6 for performing the method of the present invention. In FIG. 4, PAD 6 is placed between MODEM 500 and PSN 7 separately from PSN 7, however, this does not make any difference in principle from PAD 6 included in PSN 7 as shown in FIG. 2. In PAD 6, box 601 is a first flow control means (1st FC) which represents means for performing the function of SFC 65 with SGC 61 in FIG. 2 and box 602 is second flow control means (2nd FC) which represents means for performing the function of DFC 64 with TRU 62 in FIG. 2.

Figure 3A:
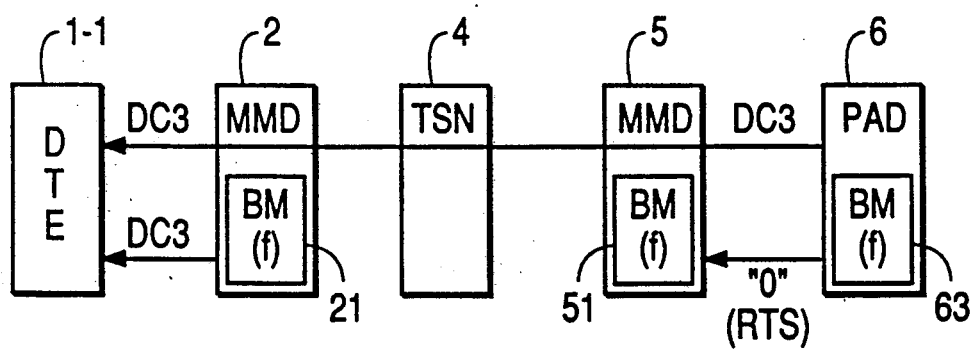
FIG. 3(a) is a block diagram showing the data flow control of the prior art.
Figure 3B:
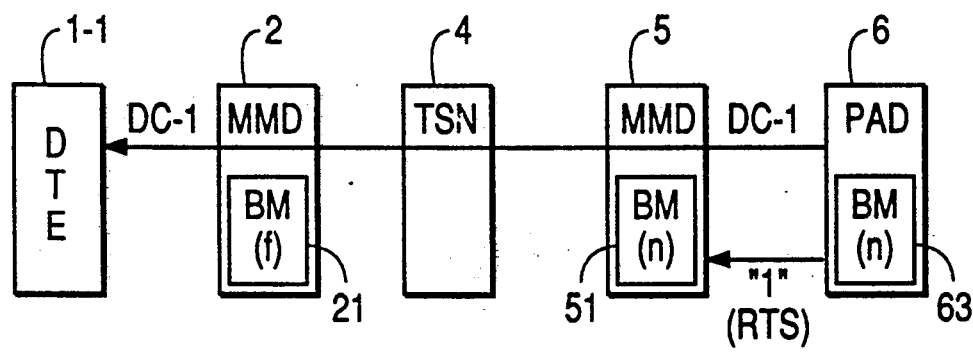
FIG. 3(b) is another block diagram showing the data flow control of the prior art.
Figure 3C:
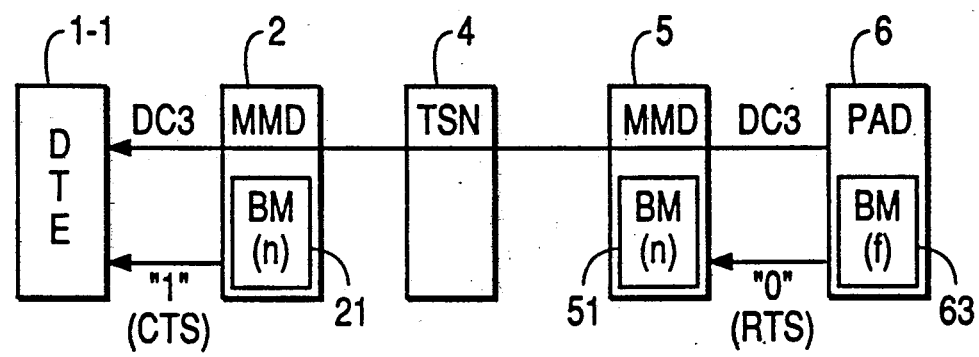
FIG. 3(c) is still another block diagram showing the data flow control of the prior art.

As described before, the first FC 601 controls the flow of data transferred between DTE 1 and PAD 6 by using the control signals such as logic "1" and "0", and the second FC 602 controls the same data flow as above, by using the control characters such as DC1 and DC2. The CLD 66 newly provided in PAD 6 is for discriminating whether data flow control is performed between MODEMs 300 and 500. If the data flow control is performed between MODEMs 300 and 500, the data flow is performed by a predetermined procedure matched to MODEMs 300 and 500 as stated above. For instance, when MNP is applied to MODEMs 300 and 500 same as MMDs 2 and 5 in FIG. 2, the data flow control is performed with the procedure matched to the MNP. Hereupon, it must be noted that the data flow control is required only where the MODEMs are special types such as MNP MODEMs requiring send and receipt of data between the MODEMs for performing error correction. When CLD 66 discriminates that data flow control is performed between MODEMs 300 and 500, CLD 66 makes the first FC 601 effective and the second FC 602 ineffective. When CLD 66 discriminates that data flow control is not performed between MODEMs 300 and 500, CLD 66 makes the first FC 601 ineffective and the second FC 602 effective. Therefore, if MMDs 2 and 5 are applied to MODEMs 300 and 500 respectively as in FIG. 2, CLD 66 discriminates the data flow control performed between MODEMs 300 and 500 and makes the first FC 601 effective and the second FC 602 ineffective respectively. Therefore, the control characters such as DC1 and DC3 are stopped from being output from PAD 6. As a result, the problem explained in reference to FIGS. 3(b) and 3(c) can be avoided.

Figure 5:
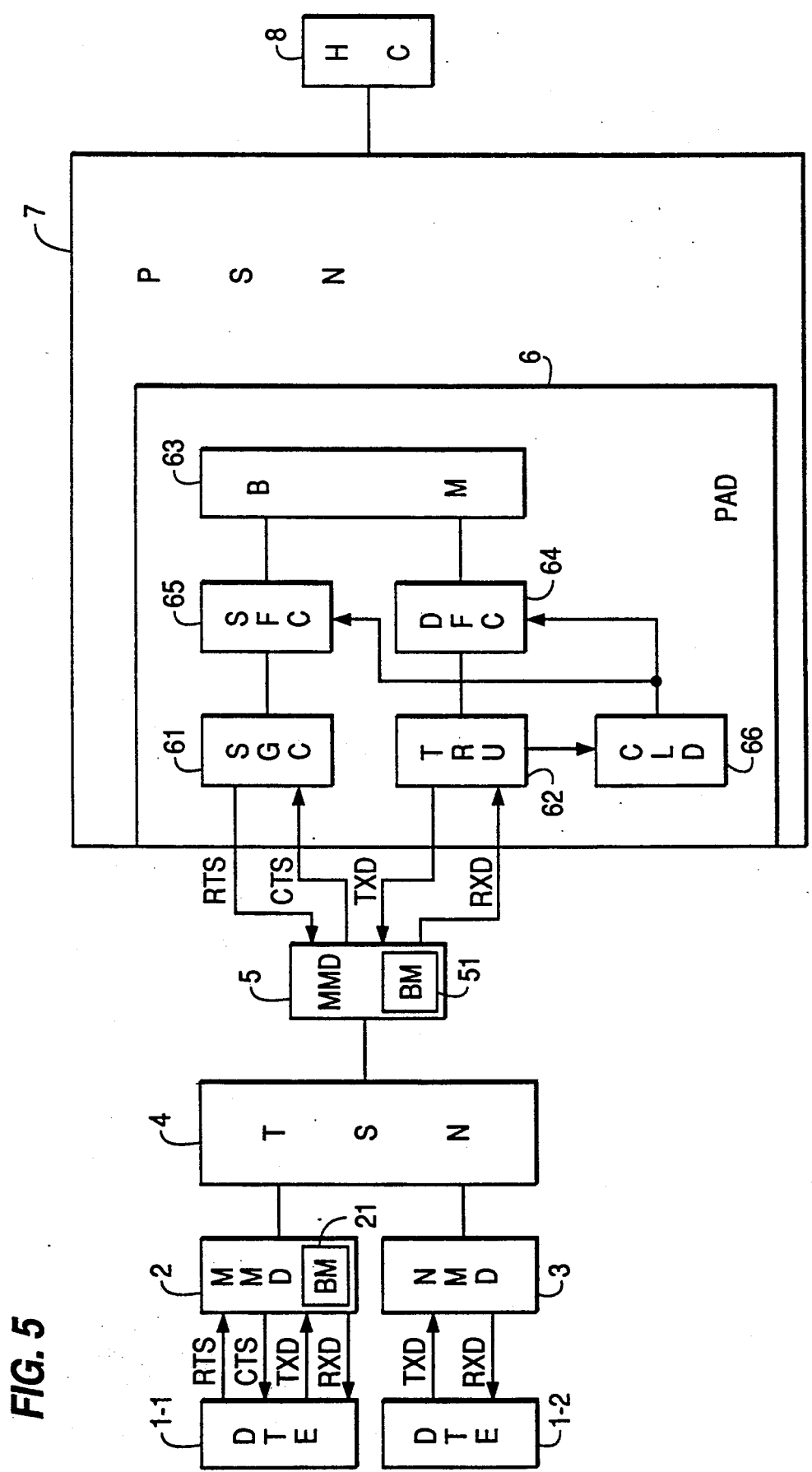
FIG. 5 is a block diagram of a packet communication system including PAD according to the present invention.
Figure 6A:
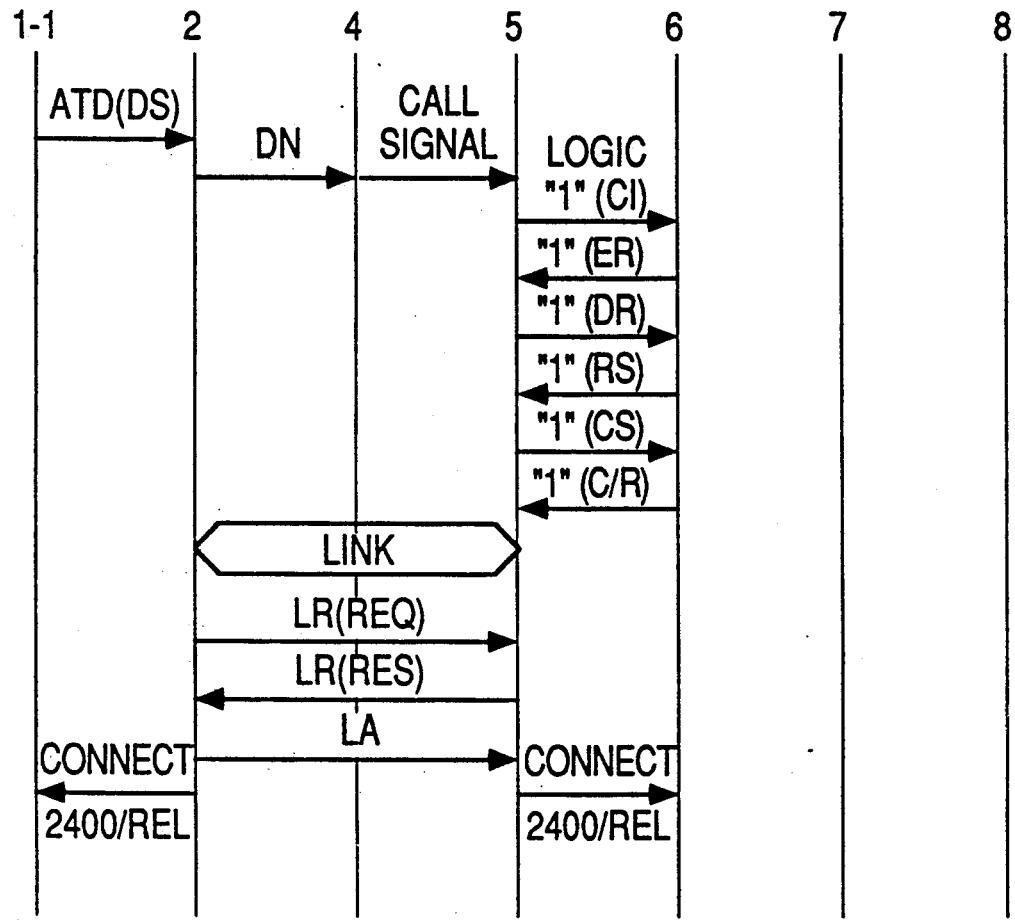
FIG. 6(a) is a sequence chart of the data flow control of the prior art, performed in the packet communication system.
Figure 6B:
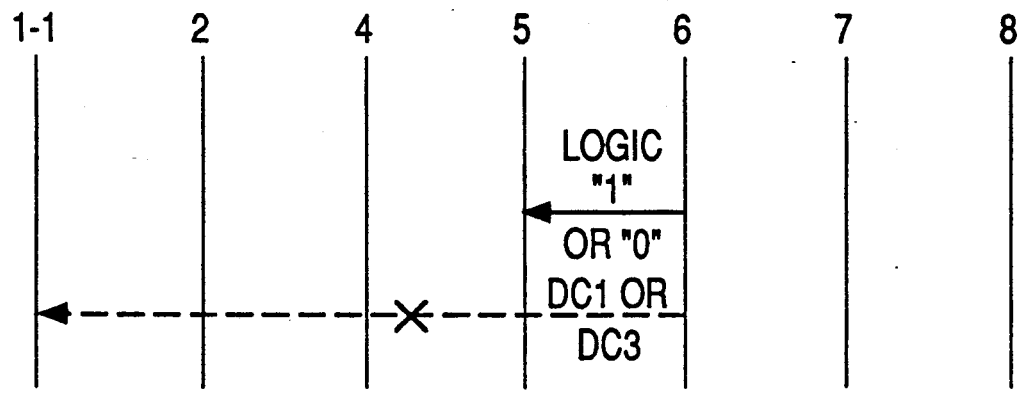
FIG. 6(b) is a sequence chart of the data flow control according to the present invention, performed in the packet communication system.
Figure 7A:
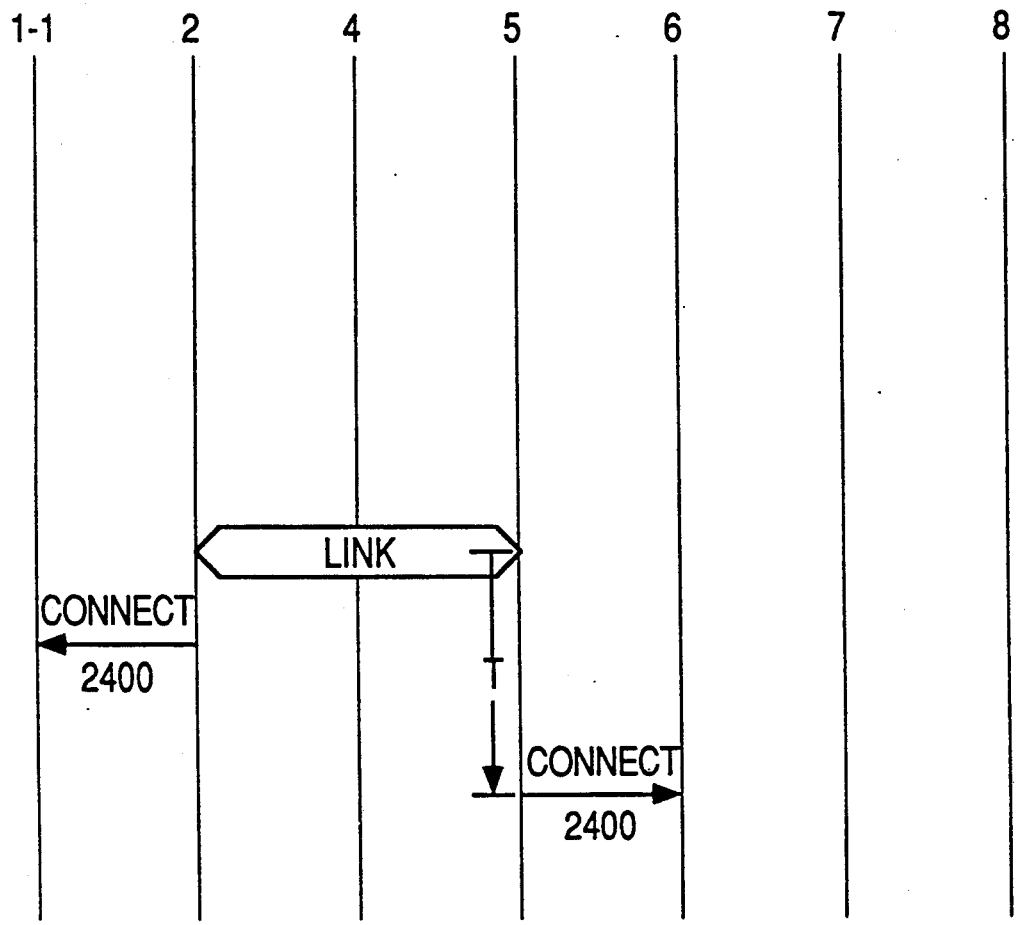
FIG. 7(a) is a sequence chart of other data flow control of the prior art, performed in the packet communication system.
Figure 7B:
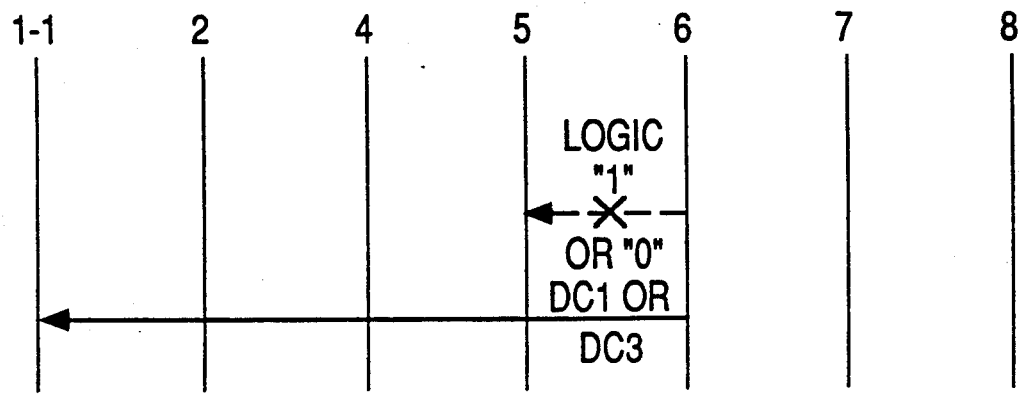
FIG. 7(b) is a sequence chart of the data flow control according to the present invention, performed in the packet communication system.

The preferred embodiment of the present invention will be explained with reference to FIG. 5, FIGS. 6(a) and 6(b) and FIGS. 7(a) and 7(b). FIG. 5 is a schematic block diagram of the packet communication system 100 to which a data flow controlling method embodying the present invention is applied. In FIG. 5, the same reference numeral as in FIG. 2 designates the same equipment or network as in FIG. 2. FIG. 6(a) is a sequence flow chart for the data transfer performed with flow control of the related art when MMD 2 is used in FIG. 5. FIG. 6(b) is a sequence flow chart, in the same case as in FIG. 6(a), for the control signal transfer performed in the packet communication system 100 in FIG. 5, in accordance with the present invention. FIG. 7(a) is an end part of a sequence flow chart for the data transfer performed with flow control of the related art, when NMD 3 is used in FIG. 5. FIG. 7(b) is a sequence flow chart, in the same case as in FIG. 7(a), for the control character transfer performed in the packet communication system 100 in FIG. 5, in accordance with the present invention. In FIGS. 6(a) and 6(b) and FIGS. 7(a) and 7(b), the same reference numeral as in FIG. 5 designate the same equipment or network as in FIG. 5.

In accordance with a well known sequence, a data link is established between MMDs 2 and 5 as will be described below with reference to FIG. 6(a): DTE 1-1 sends a dial command ATD(DS), which is also a kind of AT command, including a dialing number (DN) to MMD 2. Then MMD 2 calls TSN 4 by DN for PAD 6. When TSN 4 receives DN, TSN 4 selects PAD 6 by a well known switching method and sends a call signal to MMD 5; when MMD 5 receives the call signal, MMD 5 performs the send-receive of logic "1" signals with PAD 6 through signal lines C1 (Calling Indicator), DTR (Data Terminal Ready), DSR (Data Send Ready), RTS (Request To Send) and CTS (Clear To Send) by a well known method, wherein the signal lines C1, DTR and DSR are well known and are not depicted in FIG. 5. An answer signal ATA(C/R), which is also a type of AT command, is sent to MMD 5 from PAD 6, so that a data link is established between MMDs 2 and 5 through TSN 4. A word LINK written between lines 2 and 5 in FIG. 6(a) represents that the data link is established between MMDs 2 and 5.

When the data link is established between MMDs 2 and 5, MMD 5 stands by for receiving a well known LR(Req) signal from MMD 2 within a designated time (T). After the data link is established between MMDs 2 and 5, MMD 2 sends the LR(Req) signal to MMD 5. Then, MMD 5 sends back the LR(Res) signal to MMD 2. When MMD 2 receives the LR(Res) signal from MMD 5, MMD 2 sends a well known LA signal to MMD 5 and a well known CONNECT 2400/REL signal to DTE 1-1 at the same time, wherein "/REL" in CONNECT 2400/REL is a signal for informing that a link for error correction and flow control is established.

When the LR(Req) signal is sent to MMD 5 within time T, the LR(Res) signal and the LA signal are transferred between MMDs 2 and 5 as stated above, and at the same time MMD 5 sends the CONNECT 2400/REL signal to PAD 6 with data (payload data).

As noted in FIG. 6(a), the sequence for establishing the data link between MMDs 2 and 5 and the sequence for sending CONNECT 2400/REL signals from MMD 2 to DTE 1-1 and from MMD 5 to PAD 6 are known in the related art.

When data sent from MMD 5 is received at PAD 6 and passed through TRU 62 in PAD 6, the data is sent to DFC 64, however, separated at TRU 62 so as to be sent to CLD 66. Then, the data is checked at CLD 66 to determine whether the data includes CONNECT 2400/REL, in particular, whether REL is included in the data. When CLD 66 discriminates the CONNECT 2400/REL signal from the data, CLD 66 judges that the link for carrying out the error correction and the flow control under the MNP procedure has been established between MMDs 2 and 5, so that CLD 66 sends an ineffective signal to DFC 64 for stopping DFC 64 from operating and an effective signal to SFC 65 for leaving SFC 65 operating. As a result, DFC 64 stops the send-receive operation of DC1 and DC3 and SFC 65 operates normally so as to perform the send-receive operation of the control signals "1" or "0" for carrying out the data flow control between PAD 6 and MMD 5 and between MMD 2 and DTE 1-1. In this case, even though the data flow control is performed between DTE 1-1 and MMD 2 by using either the control characters DC1 and DC3 or the control signals "1" and "0", it never happens that the control characters DC1 and DC3 transferred from PAD 6 are used for controlling data between DTE 1-1 and MMD 2, which is shown in FIG. 6(b). In FIG. 6(b), the same reference numeral as in FIG. 6(a) designates the same equipment or network as in FIG. 6(a), and a sequence of sending DC1 or DC3 is denied by depicting a dotted arrow line having an "x" mark on it. As a result, the problems explained in reference to FIGS. 3(a), 3(b) and 3(c) can be solved by introducing CLD 66 to PAD 6.

Hereupon, the CONNECT 2400/REL signal is generally placed at a header of a data format and payload data follow the header after time (first time) passes. On the other hand, in CLD 66, time (second time) is required to discriminate the CONNECT 2400/REL signal from the data and produce the effective and the ineffective signal. However, since the second time is shorter than the first time, it is not necessary to consider that SFC 65 and DFC 64 operate with the CONNECT 2400/REL signal before the effect and the ineffect signal are applied to SFC 65 and DFC 64 respectively.

Next, a case of connecting DTE 1-2 with to PAD 6 through NMD 3, TSN 4 and MMD 5 in the packet communication system 100 will be described below in reference to FIG. 5 and FIGS. 7(a) and 7(b).

When DTE 1-2 sends a dial command ATD(DN) to NMD 3 for connecting with PAD 6, a link is established between NMD 3 and MMD 5 as shown by LINK in FIG. 7(a) in accordance with the same sequence as with the case described in reference to FIG. 6(a). When the link is established between NMD 3 and MMD 5, NMD 3 sends a CONNECT 2400 signal to DTE 1-2. On the other hand, MMD 5 stands by for receiving a LR(Req) signal from NMD 3 during a designated time (T). However, since NMD 3 does not send the LR(Req) signal to MMD 5, MMD 5 sends the CONNECT 2400 to PAD 6 with data (payload data) after the designated time T has passed.

In PAD 6, CLD 66 checks whether REL is included with the data and determines that a link for performing the error correction and the data flow control associated with the error correction based on the MNP procedure are not established between NMD 3 and MMD 5. Then, CLD 66 outputs an effective signal to DFC 64 and an ineffective signal to SFC 65 so that DFC 64 operates and SFC 65 does not operate. As a result, DFC 64 performs the send-receive operation of the control characters DC1 and DC3 between PAD 6 and DTE 1-2, and SFC 65 never performs the data flow control under the control signals such as logic "1" as shown in FIG. 7(b). Therefore, though the present invention is applied to the packet communication system 100, the data flow control can be performed by normally using the control characters.

For suggesting information, when binary data other than characters, such as programs are transferred from DTE 1-2 to PAD 6 in the packet communication system 100 in FIG. 5, it is possible that the same data as DC1 and DC3 are included in the transferring data, so that it must be considered that false data flow control would be performed. Therefore, in this case, the data flow control due to DC1 and DC3 is stopped from functioning by making DTE 1-2 or HC 8 send a proper stop command to PAD 6.

For further information regarding the binary data, when the present invention is applied to the packet communication system 100 as shown in FIG. 5, since the data flow control is performed by the control signals, in particular, using the signal lines RTS and CTS provided between DTE 1-1 and MMD 2, it is not necessary to make DTE 1-1 or HC 8 send the stop command to PAD 6 for stopping the data flow control due to the control characters DC1 and DC3 from performing.

Figure 8:
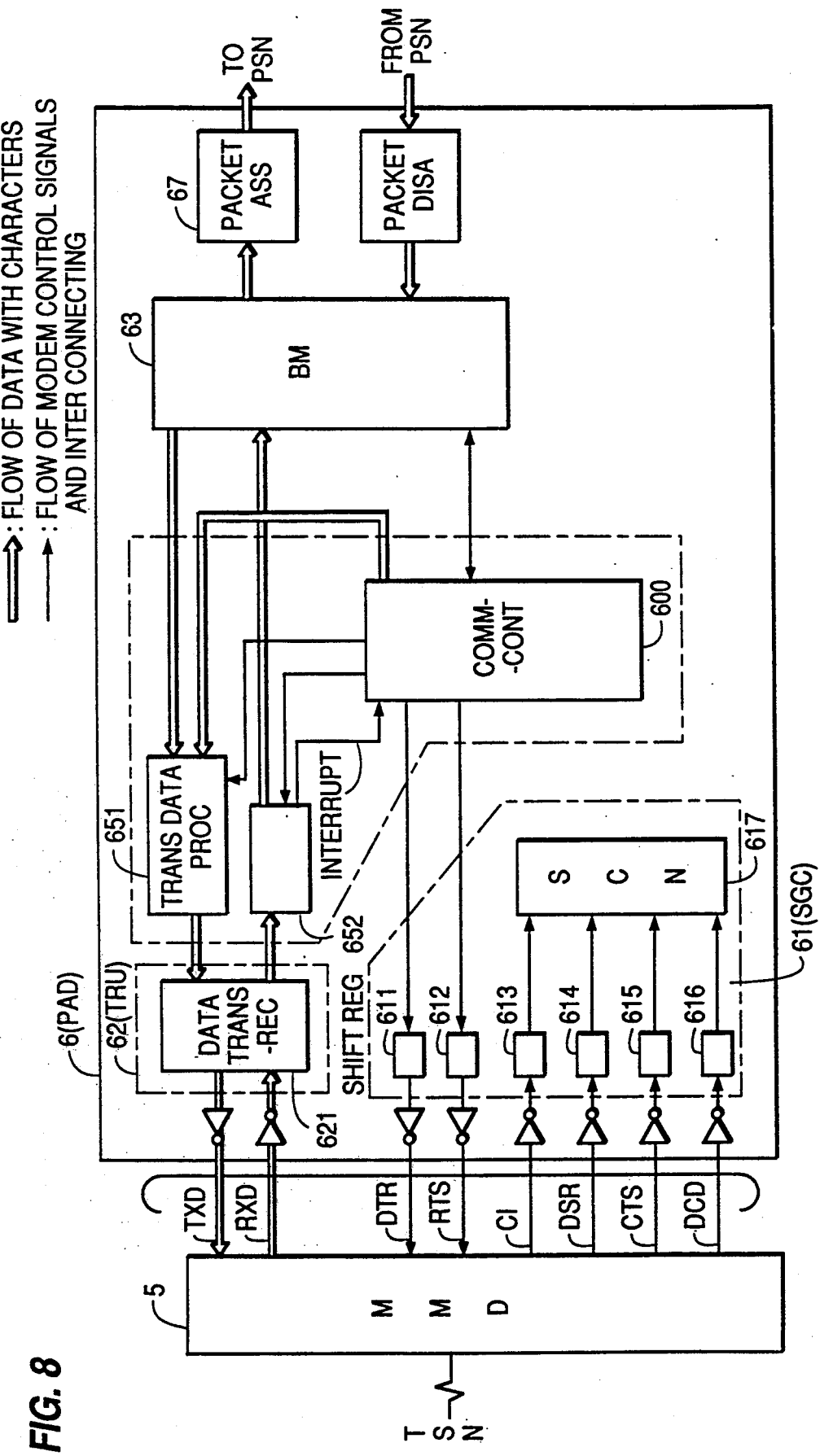
FIG. 8 is a detailed block diagram of the PAD according to the present invention.

The a detailed block diagram of PAD 6 including the present invention will be explained with reference to FIG. 8. The data flow control performed in FIG. 8 will be explained with reference to the flow chart in FIG. 9. The data flow control due to the control signals transferred between PAD 6 and MMD 5 will be explained with reference to flow charts shown in FIGS. 10(a) and 10(b), and the data flow control due to the control characters transferred between PAD 6 and DTE (1-1 or 1-2 in FIG. 5) will be explained with reference to flow charts shown in FIGS. 11(a) and 11(b). In FIG. 8, the same reference numerals or symbols used in FIG. 5 designate the same equipment or network as in FIG. 5.

In FIG. 8, the line TXD for transferring data transmitted from PAD 6 to DTE and the line RXD for receiving data sent from DTE to PAD 6 are provided between PAD 6 and MMD 5 as stated before in reference to FIG. 5. Further, there are lines between PAD 6 and MMD 5 for controlling MMD 5 from PAD 6 and for obtaining information on MMD 5, at PAD 6. That is, the following lines are located between PAD 6 and MMD 5: a line DTR (DATA TERMINAL READY) for sending a start signal (of PAD 6) from PAD 6 to MMD 5; a line RTS (REQUEST TO SEND) for sending a request signal (to MMD 5) from PAD 6 to MMD 5; a line CI (CALLING INDICATOR) for sending a signal informing that PAD 6 is in a so-called "call in" state; a line DSR (DATA SET READY) for sending a signal informing that MMD 5 is in a ready state; a line CTS (CLEAR TO SEND) for sending a signal informing that MMD 5 is capable of sending data; and a line DCD (DATA CHANNEL RECEIVED LINE SIGNAL DETECTOR) for sending a signal informing that MMD 5 detects the carrier from MMD 2 or NMD 3.

In PAD 6, TXD and RXD are connected to a data transmit-receive unit 621 provided in TRU 62. To control the signals on DTR, RTS, CI, DSR, CTS and DCD mentioned above, write registers 611 and 612 and read registers 613, 614, 615 and 616 are provided respectively, and CI, DSR, CTS and DCD are connected to a scanner (SCN) 617 through the registers 613, 614, 615 and 616 respectively.

The treatments for transferring data from PAD 6 through TXD and for transferred data to PAD 6 through RXD are performed by a transmitting data processing unit 651 and a received data processing unit 652 respectively. The unit 651 reads data from BM 63 and sends the read data to the data transmit-receive unit 621. The unit 652 performs character handling to the received data sent from the data transmit-receive unit 621, for discriminating characters from the received data one by one. After the character handling is over, the unit 652 sends the received data to BM 63 with the characters.

The control of MMD 5 is performed by a communication control unit 600 in PAD 6. That is, ON-OFF instructions generated at the communication control unit 600 are applied to DTR and RTS through the write registers 611 and 612 respectively. The state of MMD 5 is judged at the unit 600, receiving the state information on MMD 5 through SCN 617.

As shown in FIG. 8, a packet assembly interface 67 and a packet disassembly interface 68 are provided between BM 63 and PSN 7. The packet assembly interface 67 is for assembling data read out from BM 63 into a packet and sending the packet to PSN 7. The packet disassembly interface 68 is for disassembling a packet data sent from PSN 7 into start-stop mode data (non packet mode data) and sending the start-stop mode data to BM 63. Therefore, it is necessary to observe a full situation of memories in BM 63. If data are sent to BM 63 while it is in the full state, it would abandon the data. The communication control unit 600 performs the observation of the state (full state and not-full state) of BM 63.

Incidentally, the communication control unit 600 is firmware constructed in consideration of CLD 66, DFC 64 and SFC 65 in FIG. 5. Each of the CLD 66, DFC 64 and SFC 65 in FIG. 5 includes a central processing unit (CPU) and a memory (MEM) so that CLD 66, DFC 64 and SFC 65 operate under program control. That is, CLD 66, DFC 64 and SFC 65 in FIG. 5 are equal to a group consisting of the communication control unit 600, the transmitting data processing unit 651 and the received data processing unit 652 and operate under program control. This will be explained with reference to FIGS. 10(a) and (b) and FIGS. 11(a) and (b).

In FIG. 8, the data flow control of the present invention is performed as follows:

when a communication route is established between PAD 6 and DTE, before executing the communication, the received data processing unit 652 checks the data flow control for the communication route by the control signals, which will be called "MODEM control signals" hereinafter, or by the control characters, and informs the checked results to the communication control unit 600 through an interruption line (INTERRUPT); and the communication control unit 600 determines from the checked results, which data flow control should be used for the communication route—the data flow control due to the MODEM control signals or that due to the control characters.

Figure 9:
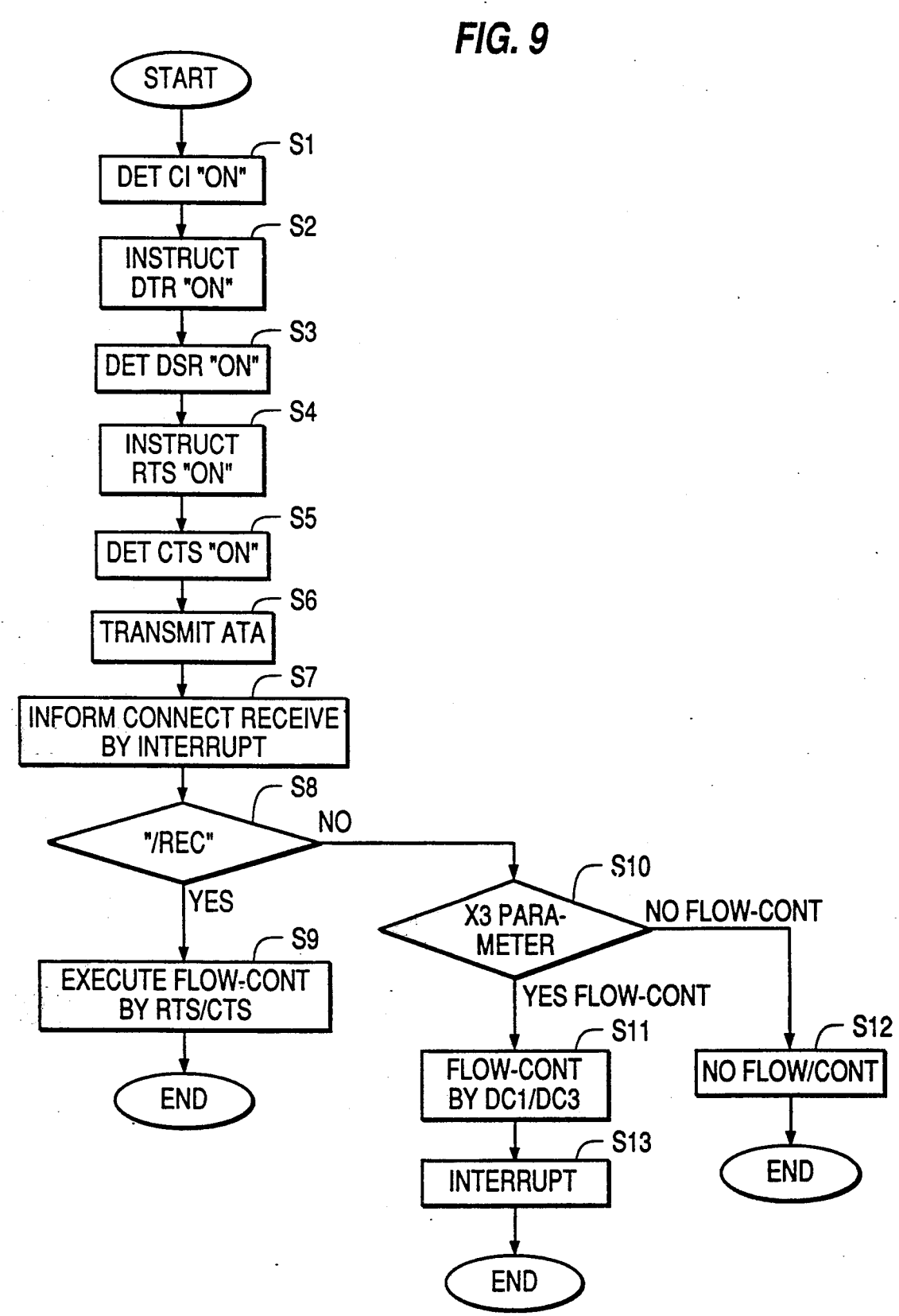
FIG. 9 is a flow chart showing the flow of control signals and characters in the PAD shown in FIG. 8.

When PAD 6 receives data from TSN 4 (refer FIG. 5), PAD 6 operates as shown by the flow chart in FIG. 9.

The communication control unit 600 recognizes that PAD 6 becomes a "call in" state from information that the signal on CI becomes ON, given through SCA 617 (step 1: S1). Then, the unit 600 issues an instruction to set the signal on DTR ON (S2) and waits until the signal on DSR becomes ON. When the unit 600 detects that the signal on DSR becomes ON (S3), the unit 600 outputs an instruction to set the signal on RTS ON and waits until the signal on CTS becomes ON.

When the communication control unit 600 detects that the signal on CTS becomes ON (S5), the unit 600 recognizes that data can be output from PAD 6. Then the unit 600 outputs the ATA command to TXD (S6) through the transmitting data processing unit 651. As a result, the connection with TSN 4 for transferring data between MODEMs facing each other is established, and a connection complete signal (CONNECT) is output from the MODEM (MMD 5).

Then, when the received data processing unit 652 receives CONNECT, the unit 652 tells the communication control unit 600 that the unit 652 received CONNECT through INTERRUPT (S7) and discriminates whether a signal "/REL" is included in CONNECT (S8). Wherein, "/REL" is a signal indicating that data flow control is performed between MODEMs through TSN 4 independently from the data flow control due to PAD 6.

When "/REL" is included in CONNECT, the communication control unit 600 performs the data flow control by using the MODEM control signals transferred through RTS and CTS (S9). If "/REL" is not included in CONNECT, the unit 600 determines that the data flow control for the communication route should be performed in accordance with an X.3 parameter recommended by CCITT. Then the unit 600 checks whether the X.3 parameter input to PAD 6 is a parameter having a value allowing flow control or a value not allowing flow control (S10). When the unit 600 determines that the data flow control is performed because the X.3 parameter is the value for performing flow control, the unit 600 determines that the data flow control is performed by DC1/DC3 in the communication route (S11), and the unit 600 sends instructions to the received data processing unit 652 so that the unit 652 receives DC1/DC3. Then, the unit 652 receives DC1/DC3, treating DC1/DC3 as the control characters, and sends a fact that the unit 652 receives DC1/DC3, to the unit 600 through the INTERRUPT (S13).

Incidentally, when the X.3 parameter is a value for not performing the flow control as mentioned in the above step S10, it does not need to perform data flow control to the communication route any more, so that the data flow control is not performed in the communication route (S12). In this case, if BM 63 becomes the full state, the data must be annulled.

Figure 10A:
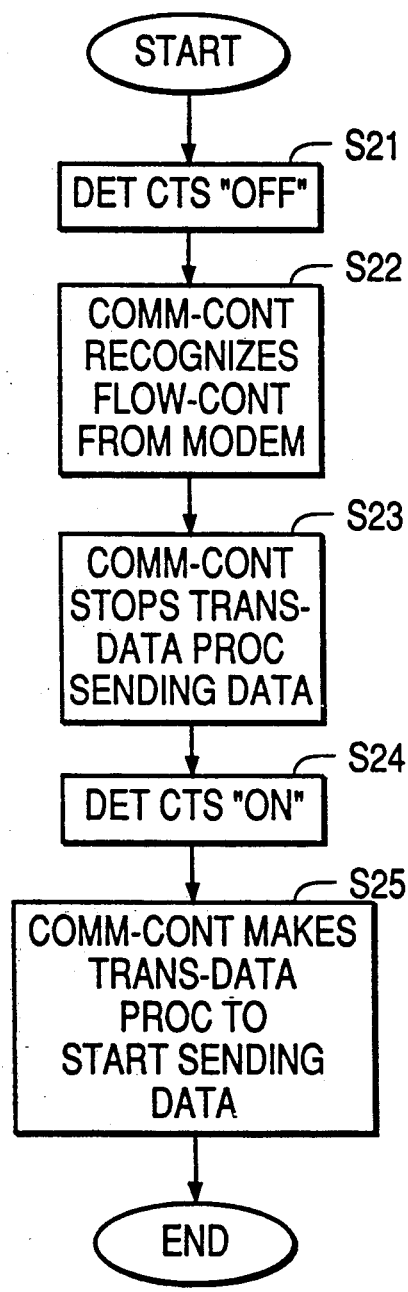
FIG. 10(a) is a flow chart showing how the PAD operates to control the control signals.
Figure 10B:
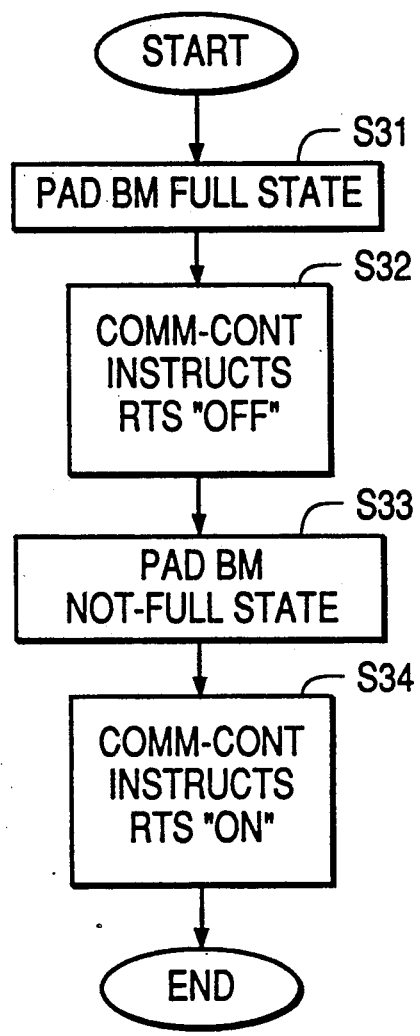
FIG. 10(b) is a flow chart showing how the PAD operates to control MMD 5 by using the control signals.

In the above step S9, when it is determined that the data flow control is performed by the MODEM control signals transferring between PAD 6 and MMD 5 through RTS/CTS, and when the unit 600 receives stop/start signals from MMD 5, the unit 600 controls PAD 6 as shown in FIG. 10(a). FIG. 10(b) is a flow chart showing how the unit 600 controls MMD 5 in response to the state of BM 63, either the full or the not-full state.

In FIG. 10(a), when the communication control unit 600 detects that the signal on the CTS becomes OFF through SCN 617 (S21), the unit 600 determines that the OFF signal is a flow stop requirement from MMD 5 (S22). Then the unit 600 outputs instructions to the transmitting data processing unit 651 to that the unit 651 stops the transmit treatment from (S23) performing. After that, when the unit 600 detects that the signal on CS becomes ON through SCN 617 (S24), the unit 600 outputs instructions to the transmitting data processing unit 651 so as to start the transmit treatment (S25).

On the other hand, in FIG. 10(b), when the communication control unit 600 detects that BM 63 becomes the full state (S31), the unit 600 outputs instructions to MMD 5 to turn the signal on RTS OFF (S32). After that, the unit 600 detects that BM 63 becomes the not-full state (S33), the unit 600 outputs to MMD 5 that the signal on RTS will become ON (S34).

Figure 11A:
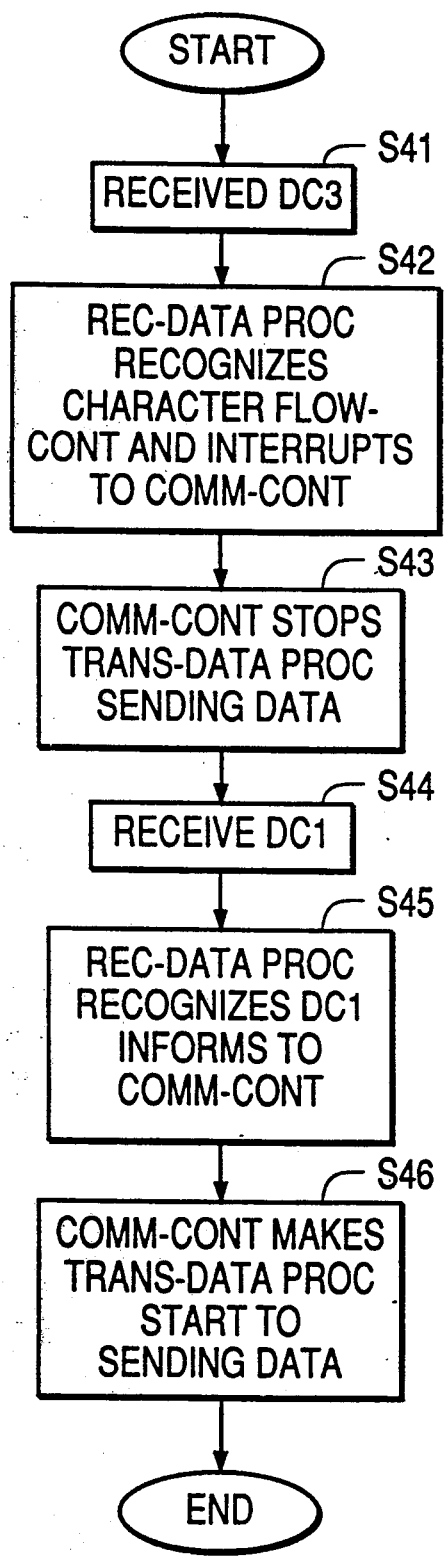
FIG. 11(a) is a flow chart showing how the PAD operates to control the control characters.
Figure 11B:
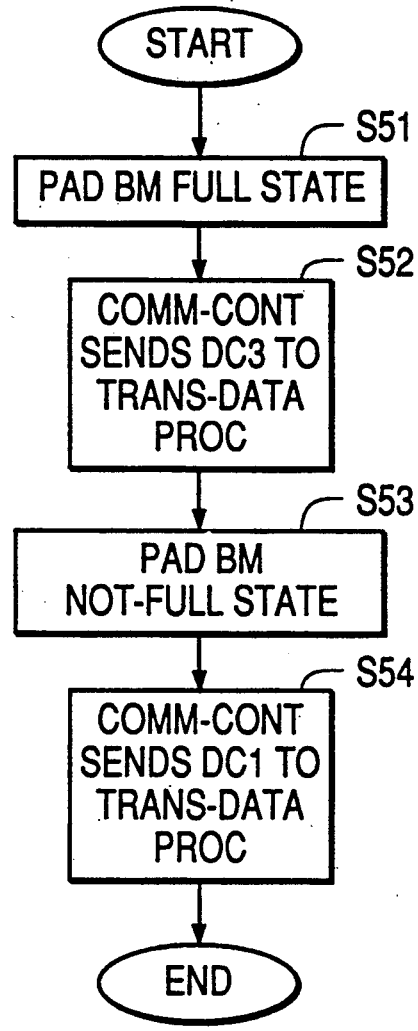
FIG. 11(b) is a flow chart showing how the PAD operates to control the DET by using the control characters.

In the above step S10 in FIG. 9, when it is determined that the data flow control is performed on the communication route in accordance with the character control, and after that when the communication control unit 600 receives characters for stop/restart for sending data from DTE, the flow chart becomes as shown in FIG. 11(a). FIG. 11(b) is a flow chart showing how the unit 600 controls DTE in response to the state of BM 63, either the full or the not-full state.

In FIG. 11(a), when the received data processing unit 652 receives DC3 which is the character for stopping data sending (S41), the unit 652 determines that DC3 is as a control character and informs the judgement to the communication control unit 600 through INTERRUPT (S42). Then, the unit 600 sends instructions to the transmitting data processing unit 651 that the unit 651 stops sending data (S43).

After that, when the received data processing unit 652 receives DC1 which is a character for starting the sending of data (S44), the unit 652 determines that DC1 is the control character and informs the communication control unit 600 through INTERRUPT (S45). Then, the unit 600 sends instructions to the transmitting data processing unit 651 that the unit 651 restarts sending data (S46).

On the other hand, in FIG. 11(b), when the communication control unit 600 detects that BM 63 becomes the full state (S51), the unit 600 outputs DC3 to MMD 5 through the transmitting data processing unit 651 so as to stop MMD 5 from sending data therefrom (S52). After that, when the unit 600 detects that BM 63 becomes the not-full state (S53), the unit 600 outputs DC1 to MMD 5 through the unit 651 so as to make MMD 5 start to send data therefrom (S54).

What is claimed is:

1. A packet communication system including a packet switching network and a telephone switching network operatively connected to each other, for performing data communication between data communication equipment connected to the packet switching network having a function of correcting errors, and data terminal equipment connected to the packet switching network having no function of correcting errors, and transmitting data between data communication equipment connected to a packet switching network in which data flow is controlled by "0" and "1" signals and connected to a packet switching network in which data flow is controlled by specific control word signals, said packet communication system comprising:

a communication line connecting the data terminal equipment and the packet switching network through the telephone switching network;

a first modulator and demodulator, first MODEM, provided on said communication line and connected to the data terminal equipment;

a first connecting line provided on said communication line, for connecting said first MODEM to the telephone switching network;

a second modulator and demodulator, second MODEM, provided on said communication line and connected to the packet switching network;

a second connecting line provided on said communication line, for connecting said second MODEM to the telephone switching network; and a packet assembly and disassembly equipment, PAD, provided on said communication line and in the packet switching network and connected to said second MODEM, said PAD comprising:

a PAD buffer memory for storing data sent from the data terminal equipment for assembling the data in a packet in the packet switching network and for storing data obtained by dissembling packet data sent from the packet switching network;

a plurality of control means for performing data flow control through said communication line in response to a plurality of control procedures; and selecting means for selecting one of said control means in accordance with whether a designated response signal is transferred through said communication line, said designated response signal being a signal teaching that designated data flow control is performed on said communication line independently from the data flow control performed by said plurality of control means.

2. A packet communication system according to claim 1, wherein said plurality of control procedures used in said plurality of control means comprise a group of MODEM control signals transferred between said PAD and said second MODEM and a group of control characters transferred through said communication line with data transferred through said communication line.

3. A packet communication system according to claim 2, wherein said plurality of control means comprise first control means operating with said MODEM control signals and second control means operating with said control characters.

4. A packet communication system according to claim 3, wherein said selecting means selects said first control means when said first and second MODEMs are the same type, said first and second MODEMs each having a buffer memory and the designated data flow control is performed between said first and second MODEMs producing the designated response signal.

5. A packet communication system according to claim 3, wherein said selecting means selects said second control means when said first MODEM is a type having no buffer memory and no designated data flow control is performed on said communication line, producing no designated response signal.

6. A packet communication system according to claim 4, wherein said MODEM control signals are logic "1" and "0", said signal logic "1" being sent from said first control means to said second MODEM for making said second MODEM send data to said PAD buffer memory when said PAD buffer memory is in a not-full state of stored data and sent from said second MODEM to said first control means for allowing said first control means to send data to said buffer memory of said second MODEM when said buffer memory in said second MODEM is in the not-full state, and said signal logic "0" being sent from said first control means to said second MODEM for stopping said second MODEM sending data to said PAD buffer memory when said PAD buffer memory is in a full state of stored data and sent from said second MODEM to said first control means for stopping said first control means from sending data to said buffer memory when said buffer memory in said second MODEM is in the full state.

7. A packet communication system according to claim 5, wherein said control characters are DC1 and DC3 of X.3 recommended by CCITT, said DC1 being sent from said second control means to the data terminal equipment for allowing the data terminal equipment to send data to said PAD buffer memory when said PAD buffer memory is in a not-full state of stored data and said DC3 being sent from said second control means to the data terminal equipment for stopping the data terminal equipment from sending data to said PAD buffer memory when said PAD buffer memory is in a full state of stored data, and said DC1 being sent from the data terminal equipment to said second control means for making said second control means send data to the data terminal equipment when a buffer memory of the data terminal equipment is in the not-full state and said DC3 being sent from the data terminal equipment to said second control means for stopping said second control means from sending data to the data terminal equipment when a buffer memory in said data terminal equipment is in the full state.

8. A packet communication system according to claim 6, wherein the designated response signal is a signal "/REL" in a signal CONNECT$\alpha\beta\gamma\delta$/REL.

9. A data flow control system for controlling data transfer in a packet communication system, the packet communication system including a plurality of data terminal equipment, DTE, a first modulator and demodulator, MODEM, connected to the DTE, a telephone switching network, TSN, a packet switching network, PSN, a second MODEM connected to the PSN provided on a line connecting the TSN and the PSN and a plurality of data communication equipment connected to the PSN, the PSN including packet assembly and disassembly equipment, PAD, connected to the second MODEM, the PAD including a buffer memory for storing data so as to form a packet of data, first data flow control means for controlling data transfer between the buffer memory and the second MODEM and second data flow control means for controlling data transfer between the buffer memory and the DTE, the PAD in said system having classified link discriminator means comprising:

analyzing means for analyzing whether a designated signal informing that data flow control is performed only between the first and second MODEMs independently from the data flow control performed due to the PAD, is in data sent from the DTE to the PAD; and selecting means for selecting one of the first and second data flow control means in the PAD controlling the first data flow control means in the PAD, said selection being performed by making the first and the second data flow control means in the PAD effective and ineffective respectively when said designated signal is distinguished from the data and by making the first and second data flow control means in the PAD inoperative and operative respectively when said designated signal is not distinguished from the data.

10. A flow control method of data transferred between one piece of data terminal equipment, DTE, and a packet switching network, PSN, on a communication line through a first modulator and demodulator, MODEM, connected to the DTE, a telephone switching network (TSN) connected to the first MODEM and a second MODEM provided between the TSN and the PSN, the PSN including packet assembly and disassembly equipment (PAD) directly connected to the second MODEM and provided for assembling and disassembling data transferred between the DTE and one of a plurality of data communication equipment connected to the PSN through a buffer memory included in the PAD and for controlling the flow of data between the DTE and the PSN through the communication line, the first MODEM having two types, a first type having a buffer memory and a second type having no buffer memory, the second MODEM being the first type, the first and second MODEMs being used for correcting errors generated in data transferred through the TSN when the first and second MODEMs are the first type, data being transferred between the first and second MODEMs under designated data flow control independently from the data flow control due to the PAD when the first and second MODEMs have the buffer memory respectively, said flow control method of data comprising the steps of:

(a) controlling a flow of data transferred on the communication line through the second MODEM by MODEM control signals, the MODEM control signals being controlled by first flow control means provided in the PAD and by the second MODEM having the buffer memory;

(b) controlling a flow of data transferred between the DTE and the PAD on the communication line by control characters, the control characters being transferred with data transferred between DTE and the PAD and controlled by second flow control means provided in the PAD;

(c) separating data transferred with header signals between the DTE and the PAD, at the PAD;

(d) discriminating whether a designated response signal is included in the header signals separated at the PAD, the designated response signal being output from the second MODEM and sent to the PAD when the designated data flow control is performed between the first and second MODEMs;

(e) selecting said step (a) by making the first flow control means operative and the second flow control means inoperative when the designated response signal is discriminated from the header signals; and (f) selecting said step (b) by making the first flow control means inoperative and the second flow control means operative when no designated response signal is discriminated from the header signals.

11. A flow control method according to claim 10 further comprising the step of controlling the flow of data transferred between the DTE and the first MODEM, by the DTE and the first MODEM by using either one of a group of the MODEM control signals or a group of the control characters, the selection of the groups being performed by the DTE when the first MODEM has the buffer memory, the DTE having a buffer memory.

12. A flow control method according to claim 11, wherein the designated response signal is a signal "/REL" in a signal CONNECT$_{ABQW}$/REL.

13. A flow control method according to claim 11, wherein the MODEM control signals are logic "1" and "0" and the control characters are DC1 and DC2 in X.3 recommended by CCITT, sending the logic "1" from the first flow control means to the second MODEM for making the second MODEM send data to the PAD when the buffer memory in the PAD is in a not-full state of stored data and sending the logic "1" from the second MODEM to the first flow control means for making the PAD send data to the second MODEM when the buffer memory in the second MODEM is in the not-full state, sending the logic "0" from the first flow control means to the second MODEM for stopping the second MODEM sending data to the PAD when the buffer memory in the PAD is in a full state of stored data and sending the logic "0" from the second MODEM to the first flow control means for stopping the PAD from sending data to the second MODEM when the buffer memory in the second MODEM is in the full state, sending DC1 from the second flow control means to the DTE for making the DTE send data to the PAD when the buffer memory in the PAD is in the not-full state, sending the logic "0" from the second flow control means to the DTE for stopping the DTE from sending data to the PAD when the buffer memory in the PAD is in the full state.

* * * * *

UNITED STATES PATENT AND TRADEMARK OFFICE
CERTIFICATE OF CORRECTION

PATENT NO. : 5,197,067   Page 1 of 2
DATED : MARCH 23, 1993
INVENTOR(S) : AKIO FUJIMOTO ET AL.

It is certified that error appears in the above-indentified patent and that said Letters Patent is hereby corrected as shown below:

TITLE PAGE [57] ABSTRACT,
    line 10, "performed:" should be --performed by--;
    line 11, "REL." should be --REL,--.

Figure 1:
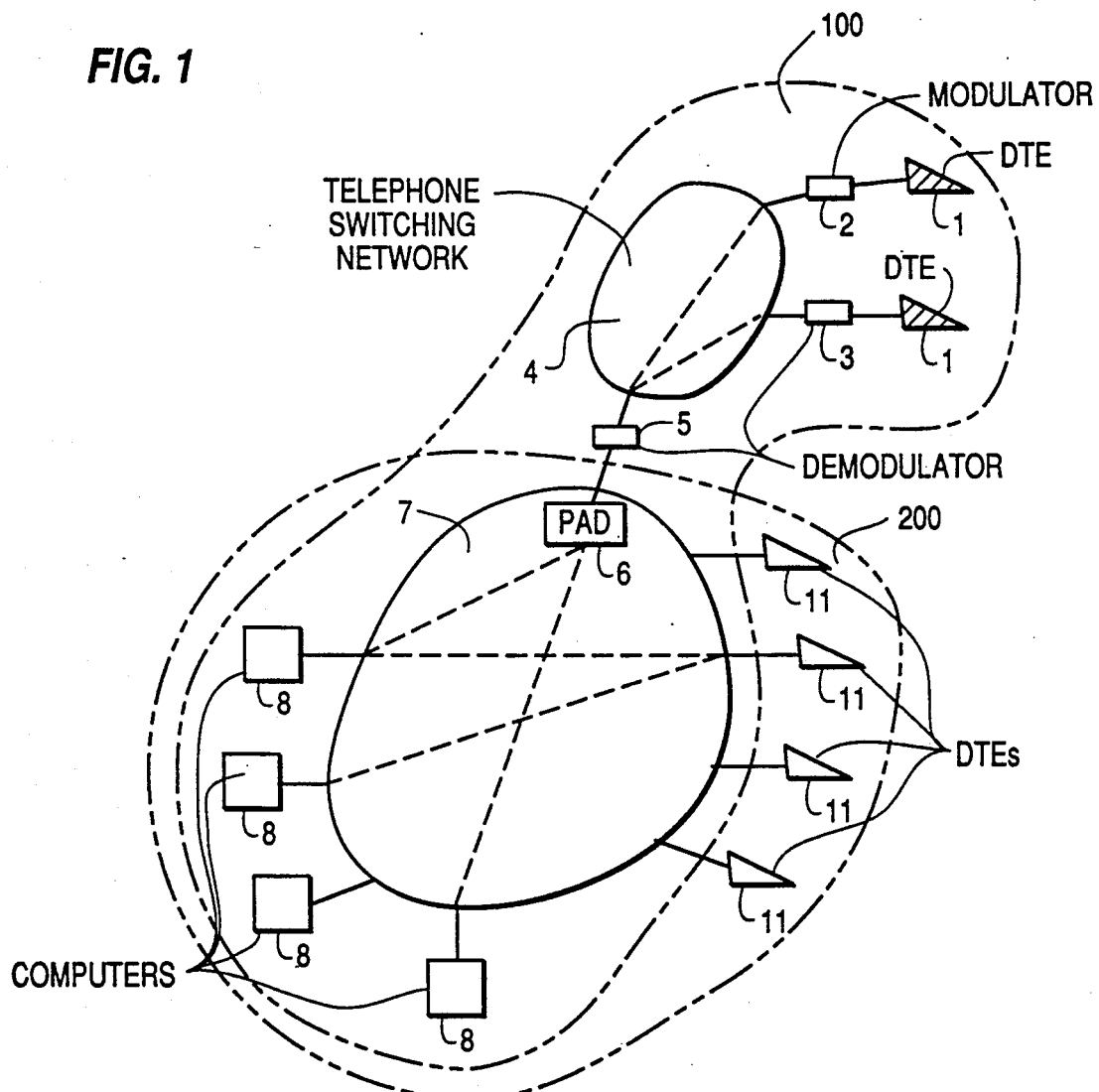
FIG. 1 is a schematic illustration of a typical packet communication system which relates to the present invention.

IN THE DRAWINGS, Sheet 1 of 11, FIG. 1,
    "Modulator" should be --MODEM--;
    "Demodulator" should be --MODEM--.

Col. 1, line 17, "system" should be --systems--.

Col. 3, line 38, "of" should be deleted.

Col. 4, line 54, "includes of:" should be --includes--.

Col. 5, line 59, "BM 51" should be --BM 63--; and
       line 59, "BMs 51" should be --BM 51--.

Col. 6, line 36, "now becomes" should be --is now--.

Col. 7, line 10, "to of the" should be --to the--;
       line 55, "called" should be deleted.

Col. 8, line 54, "MMD 5; when" should be --MMD 5. When--.

UNITED STATES PATENT AND TRADEMARK OFFICE
CERTIFICATE OF CORRECTION

PATENT NO. : 5,197,067
DATED : MARCH 23, 1993
INVENTOR(S) : AKIO FUJIMOTO ET AL.

It is certified that error appears in the above-indentified patent and that said Letters Patent is hereby corrected as shown below:

Col. 10, line 13, "with" (second occurrence) should be --in--;
line 14, "in" should be --with--;
line 58, "a" should be deleted.

Col. 13, line 31, "to" should be --so--.
line 56, "as" should be deleted;
line 59, "651 that" should be --651 so that--;
line 67, "651 that" should be --651 so that--.

Signed and Sealed this

Twenty-second Day of March, 1994

Attest:

BRUCE LEHMAN

Attesting Officer

Commissioner of Patents and Trademarks